(12) United States Patent
Platt et al.

(10) Patent No.: US 11,111,665 B2
(45) Date of Patent: Sep. 7, 2021

(54) COMPOSITE INSULATION BATT (71) Applicants: David Platt, West Jordan, UT (US); JR Reimann, Palm Desert, CA (US)

(72) Inventors: David Platt, West Jordan, UT (US); JR Reimann, Palm Desert, CA (US)

(73) Assignee: INSULXTREME CORP, Las Vegas, NV (US)

(*) Notice: Subject to any disclaimer, the term of this patent is extended or adjusted under 35 U.S.C. 154(b) by 0 days.

(21) Appl. No.: 16/823,097

(22) Filed: Mar. 18, 2020

(65) Prior Publication Data

US 2020/0299954 A1 Sep. 24, 2020

Related U.S. Application Data (60) Provisional application No. 62/821,665, filed on Mar. 21, 2019.

(51) Int. Cl.
*E04B 1/76* (2006.01)
*B32B 5/02* (2006.01)

(52) U.S. Cl.
CPC .............. *E04B 1/7662* (2013.01); *B32B 5/02* (2013.01); *B32B 2262/101* (2013.01); *B32B 2307/304* (2013.01)

(58) Field of Classification Search
CPC ........... E04B 1/7662; E04B 2001/7691; E04B 2/707; E04B 1/767; B32B 2307/304; B32B 5/245; B32B 2307/416
See application file for complete search history.

(56) References Cited

U.S. PATENT DOCUMENTS

| 2,700,633 | A |   | 1/1955 | Bovenkerk |
| 3,003,902 | A |   | 10/1961 | McDuff |
| 4,172,345 | A |   | 10/1979 | Alderman |
| 4,313,993 | A | * | 2/1982 | McGlory .................. B32B 3/28 428/178 |
| 4,669,632 | A |   | 6/1987 | Kawasaki et al. |
| 5,330,816 | A |   | 7/1994 | Rusek |
| 5,817,387 | A |   | 10/1998 | Allwein et al. |
| 5,848,509 | A | * | 12/1998 | Knapp .................... E04B 1/767 52/406.2 |
| 5,987,833 | A |   | 11/1999 | Heffelfinger et al. |
| 6,183,838 | B1 |  | 2/2001 | Kannankeril |
| 2006/0201089 | A1 | * | 9/2006 | Duncan ................. E04B 1/7658 52/309.8 |
| 2010/0065206 | A1 | * | 3/2010 | Romes ..................... B32B 5/24 156/293 |
| 2016/0272774 | A1 | * | 9/2016 | Snider .................... C08G 18/00 |

FOREIGN PATENT DOCUMENTS

| WO | WO 1991017326 | 11/1991 |
| WO | WO 1993002853 | 2/1993 |

* cited by examiner

*Primary Examiner* — Patrick J Maestri
(74) *Attorney, Agent, or Firm* — Pate Peterson PLLC; Brett Peterson (57) ABSTRACT A composite insulation batt is provided. The composite insulation batt includes a fiberglass insulation core within a sheath of closed cell plastic material and provides greatly increased insulating properties over conventional fiberglass insulation batts.

20 Claims, 6 Drawing Sheets

COMPOSITE INSULATION BATT

PRIORITY

The present application claims the benefit of U.S. Provisional Application Ser. No. 62/821,665, filed Mar. 21, 2019, which is herein incorporated by reference in its entirety.

THE FIELD OF THE INVENTION

The present invention relates to insulation. In particular, examples of the present invention relates to a composite insulation batt for use in insulating buildings and other structures.

BACKGROUND

Insulation is typically used in construction to improve the functionality of the building for its occupants. Insulation is used to reduce the heating and cooling load of the structure and improve temperature regulation within the structure. Insulation can also provide other benefits such as sound reduction within the structure.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be such as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a number or numerical range endpoint by providing that a given value may be "a little above" or "a little below" the number or endpoint.

The disclosure particularly describes how to increase the insulating properties of fiberglass insulation batts. Particularly, the present disclosure describes a composite insulation batt with dramatically increased R-value (the resistance to conductive heat transfer through the insulation) as compared to a traditional insulation batt.

Figure 1:
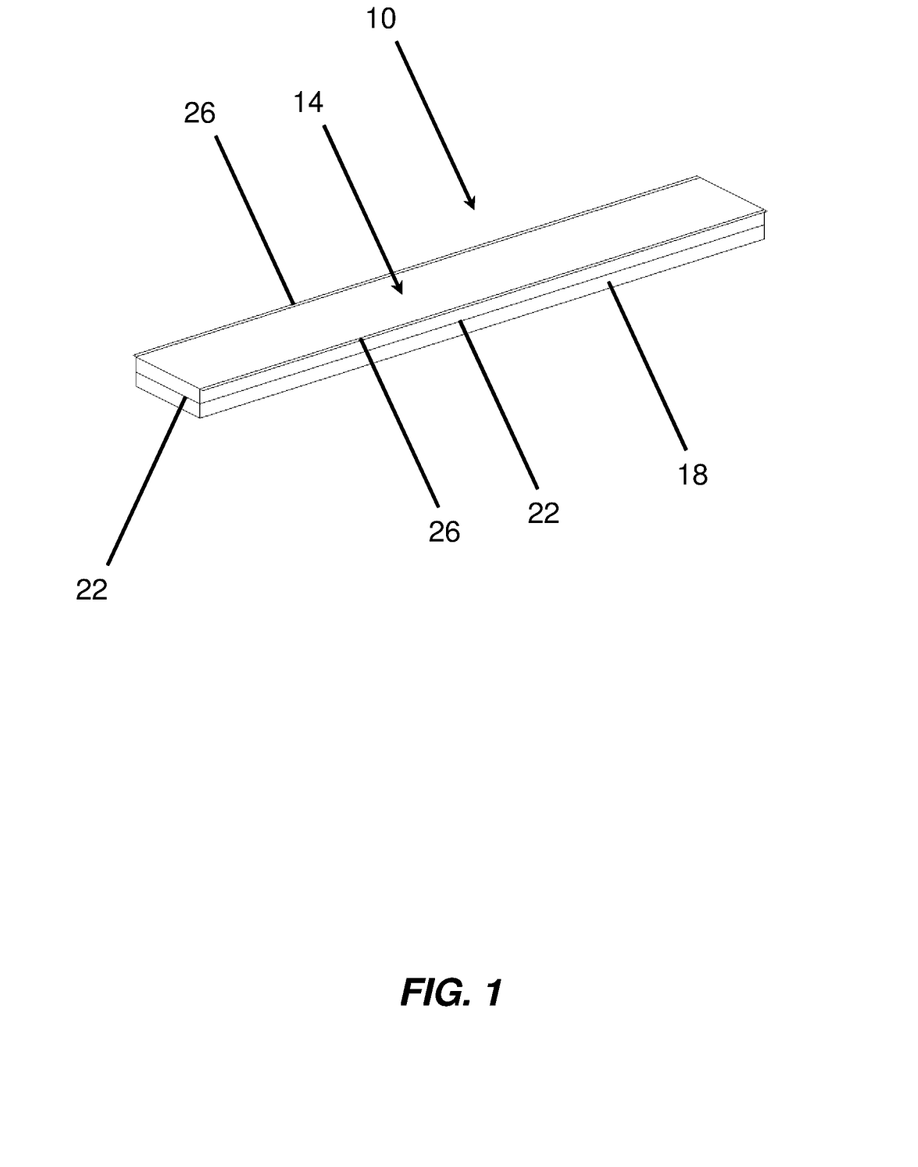
FIG. 1 is a drawing which shows a perspective view of a composite insulation batt.

Turning now to FIG. 1, a perspective view of an example composite insulation batt 10 is shown. The composite insulation batt includes a fiberglass insulation batt 14 forming its core and an insulating sheath 18 which is wrapped around the fiberglass batt core 14. The composite insulation batt 10 is sized to fit within common wall, floor, or ceiling cavities and thus may often be about 15 inches wide or about 23 inches wide, and may often be about 3.5 inches thick, about 5.5 inches thick, about 7.5 inches thick, about 9.5 inches thick, or about 11.5 inches thick. The composite insulation batt 10 may be manufactured in standard lengths to fit common building cavities such as being formed in standard lengths to fit 8 foot, 9 foot, or 10 foot walls. The composite insulation batt 10 may also be manufactured to custom lengths or may be provided in long lengths and may be cut to length for installation. For certain projects, the composite insulation batt 10 may be manufactured on location to create needed lengths.

The insulating sheath 18 is wrapped around the long faces of the core fiberglass batt 14 and frequently covers the end faces of the fiberglass batt 14. In manufacture, the insulating sheath 18 has a long length to extend over the fiberglass batt 14 and a width which allows it to be wrapped around the fiberglass batt 14 with some overlap for fastening at a seam 22 along the length of the fiberglass batt 14. As is shown, the sheath 18 may be sealed together around the ends of the composite insulation batt 10.

The insulating sheath 18 fits snugly around the fiberglass batt core 14 and does not easily shift or move around the batt core 14. The structure of the sheath 18 surrounding the fiberglass batt core 14 makes the composite insulation batt 10 handle more rigidly than a bare fiberglass insulation batt. This may assist installers in placing the composite insulation batt 10 into building cavities as the composite insulation batt 10 is less likely to sag or bend due to gravity during installation. Where the building cavity contains a wire, electrical box, or other intrusive item, the composite insulation batt 10 may be cut or trimmed with conventional tools to fit around the intrusion.

The sheath 18 is also beneficial in containing fiberglass fibers from the fiberglass insulation batt core 14. Workers installing the composite insulation batt 10 are typically exposed to significantly less fiberglass fiber and dust.

Figure 2:
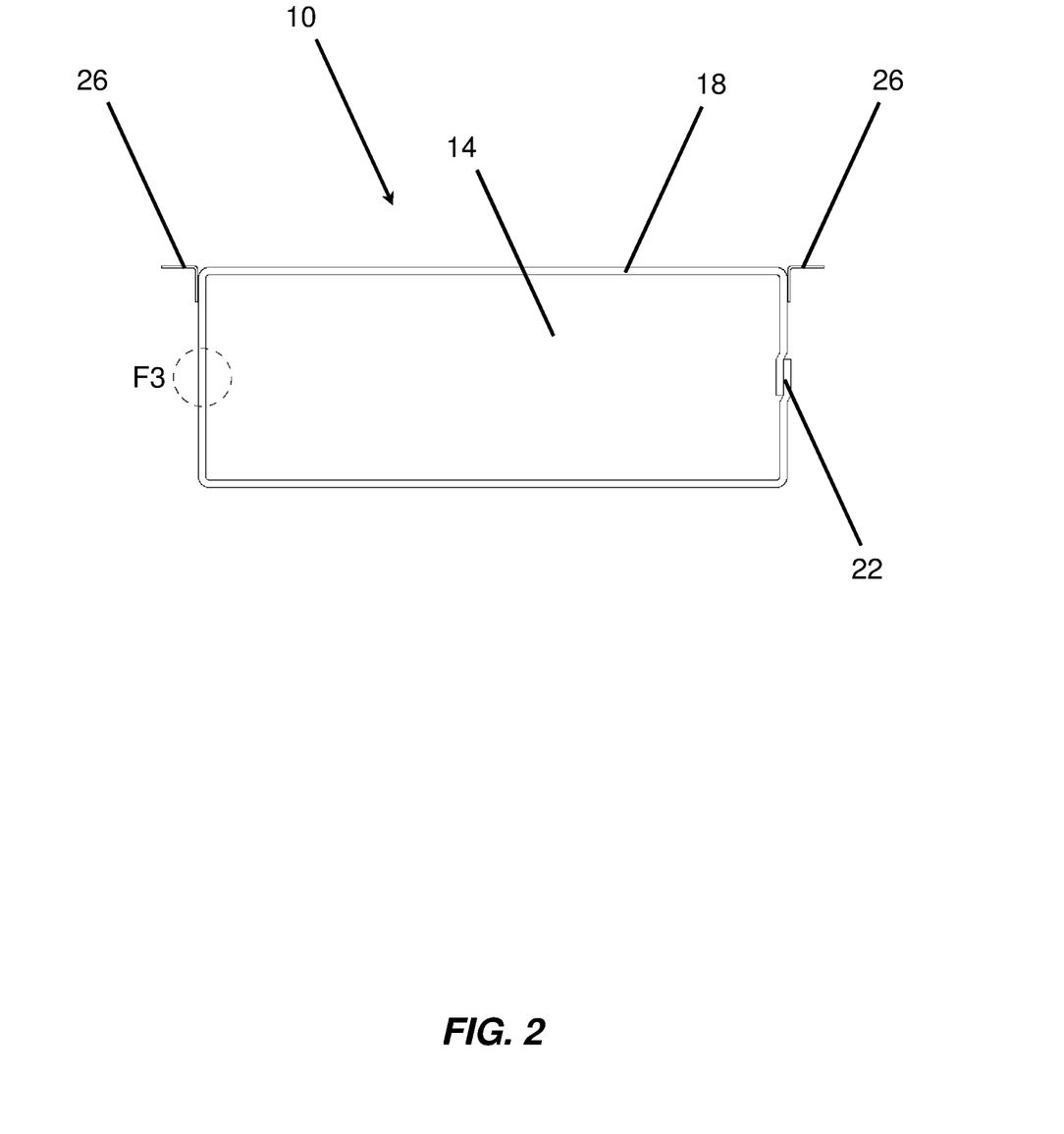
FIG. 2 is a drawing which shows a cross-sectional view of the composite insulation batt.

FIG. 2 shows a cross-sectional view of the composite insulation batt 10 taken across the length of the composite insulation batt 10. FIG. 2 shows the elongate batt of fiberglass insulation 14 which forms the core of the composite insulation batt 10. The fiberglass insulation batt 14 is encased within the insulating sheath 18. The insulating sheath 18 is wrapped around the inside and outside faces and the two sides of the fiberglass insulation batt 14 and the long edges of the insulating sheath 18 are joined together at a seam 22 along the length of the composite insulation batt 10. The insulating sheath 18 is a closed cell plastic material. Accordingly, the edges of the insulating sheath material may be attached together along the seam 22 with adhesive, fusion, etc. If desired, staple/attachment flanges 26 may be attached to the composite insulation batt 10. The attachment flanges 26 are elongate and extend along the length of the composite insulation batt 10. The attachment flanges may typically be formed from paper or plastic and may typically be attached to the insulating sheath 18 with adhesive or by fusing the materials together. The attachment flanges are used to attach the composite insulation batt 10 to building wall studs, joists, etc.

Figure 3A:
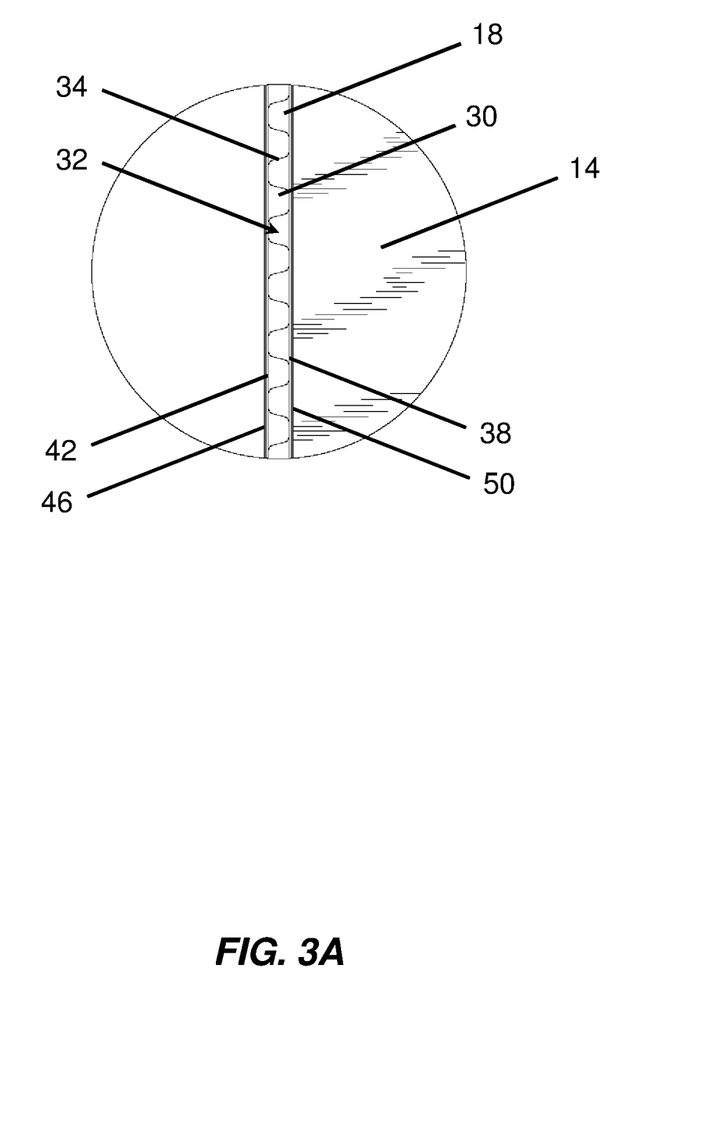
FIG. 3A is a drawing which shows a more detailed cross-sectional view of a portion of the composite insulation batt.

FIG. 3A shows an enlarged view of a section of the edge of the fiberglass batt 14 and the insulating plastic sheath 18 as indicated at F3 in FIG. 2. The insulating sheath 18 is closely fit around the fiberglass batt 14 and need not be attached to the fiberglass batt core 14 with adhesive to achieve sufficient rigidity and resist relative movement between the insulating sheath 18 and fiberglass batt 14. The insulating sheath 18 is formed with a core 30 of closed cell plastic. In one example, the core 30 is formed from polyethylene plastic. As shown, the core 30 of the insulating sheath 18 is formed with uniformly sized bubble pockets 32. Such a structure includes a 3D formed central sheet 34 of plastic attached to an inside face sheet 38 and an outside face sheet 42 of plastic. In another example, the core 30 may be formed with a larger number of irregularly or regularly shaped closed cells between thin layers of plastic.

The insulating plastic sheath 18 is preferably formed with an outer layer 46 of a reflective material such as aluminum or metalized plastic, polyester, or polyethylene terephthalate film (e.g. Mylar) and also an inner layer 50 of a reflective material such as aluminum or metalized plastic, polyester, or polyethylene terephthalate film (e.g. Mylar). The outer layer 46 and inner layer 50 of reflective material are attached to the closed cell core 30 during manufacture of the insulating sheath material. In some applications, the inner face of the insulating sheath 18 need not include a reflective layer 50 to achieve the benefit of the invention.

The core 30 of the insulating sheath 18 is a layer of low density plastic material. The core 30 is typically about 90 percent or greater air space and is preferably about 95 percent or greater air space and may be a foamed closed cell plastic or a more uniformly structured closed cell plastic which provides air cavities or bubbles therein. As discussed, the example core 30 is formed by layers of polyethylene which have been formed to create more uniform bubbles therebetween. Typical manufacture includes forming the inner layer 34 of plastic to create the bubble cells, thermally fusing the inner layer 34 to the inside face layer 38 and outside face layer 42 of plastic, and attaching the outer reflective layer 46 and inner reflective layer 50 to the inside face layer 38 and outside face layer 42. All of these layers 34, 38, 42, 46, 50 may be thermally attached to each other during the construction of the sheath material 18.

Figure 3B:
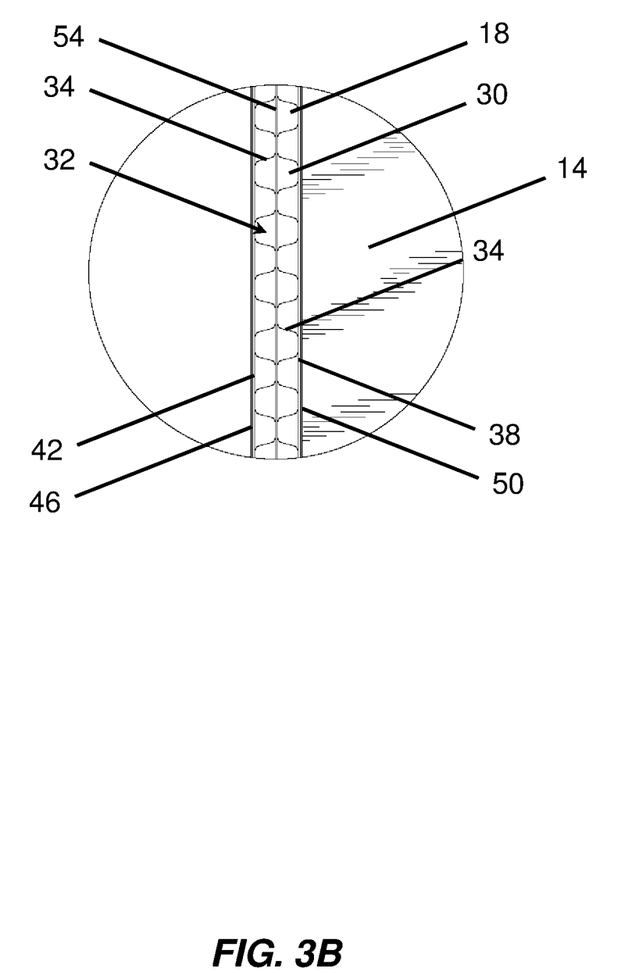
FIG. 3B is a drawing which shows a more detailed cross-sectional view of a portion of the composite insulation batt.

FIG. 3B shows another enlarged view of the section of the edge of the fiberglass batt 14 and the insulating plastic sheath 18 indicated at F3 in FIG. 2. In this example, the insulating sheath 18 is formed with a core 30 of closed cell plastic which includes two distinct layers of closed cell material. The core 30 may again be formed from polyethylene plastic. As shown, the core 30 of the insulating sheath 18 is formed with two layers of uniformly sized bubble pockets 32. Such a structure includes a generally flat central sheet of plastic 54, two 3D formed sheets 34 of plastic attached to alternate sides of the central sheet 54 with an inside face sheet 38 and an outside face sheet 42 of plastic attached to the 3D formed sheets 34 to create bubbles between these sheets of plastic.

The example insulating plastic sheath 18 is preferably formed with an outer layer 46 of a reflective material such as aluminum or metalized polyester film (e.g. Mylar) and also an inner layer 50 of a reflective material such as aluminum or metalized polyester film. The outer layer 46 and inner layer 50 of reflective material are attached to the closed cell core 30 during manufacture of the insulating sheath material. In some applications, the inner face of the insulating sheath 18 need not include a reflective layer 50 to achieve the benefit of the invention.

The core 30 of the insulating sheath 18 is thicker than the core 30 shown in FIG. 3A and increases the insulating properties of the composite insulation batt 10. The example material forming the insulating sheath 18 may be approximately 0.3 inches thick while the example material forming the insulating sheath 18 shown in FIG. 3A is approximately 0.15 inches thick.

Figure 4:
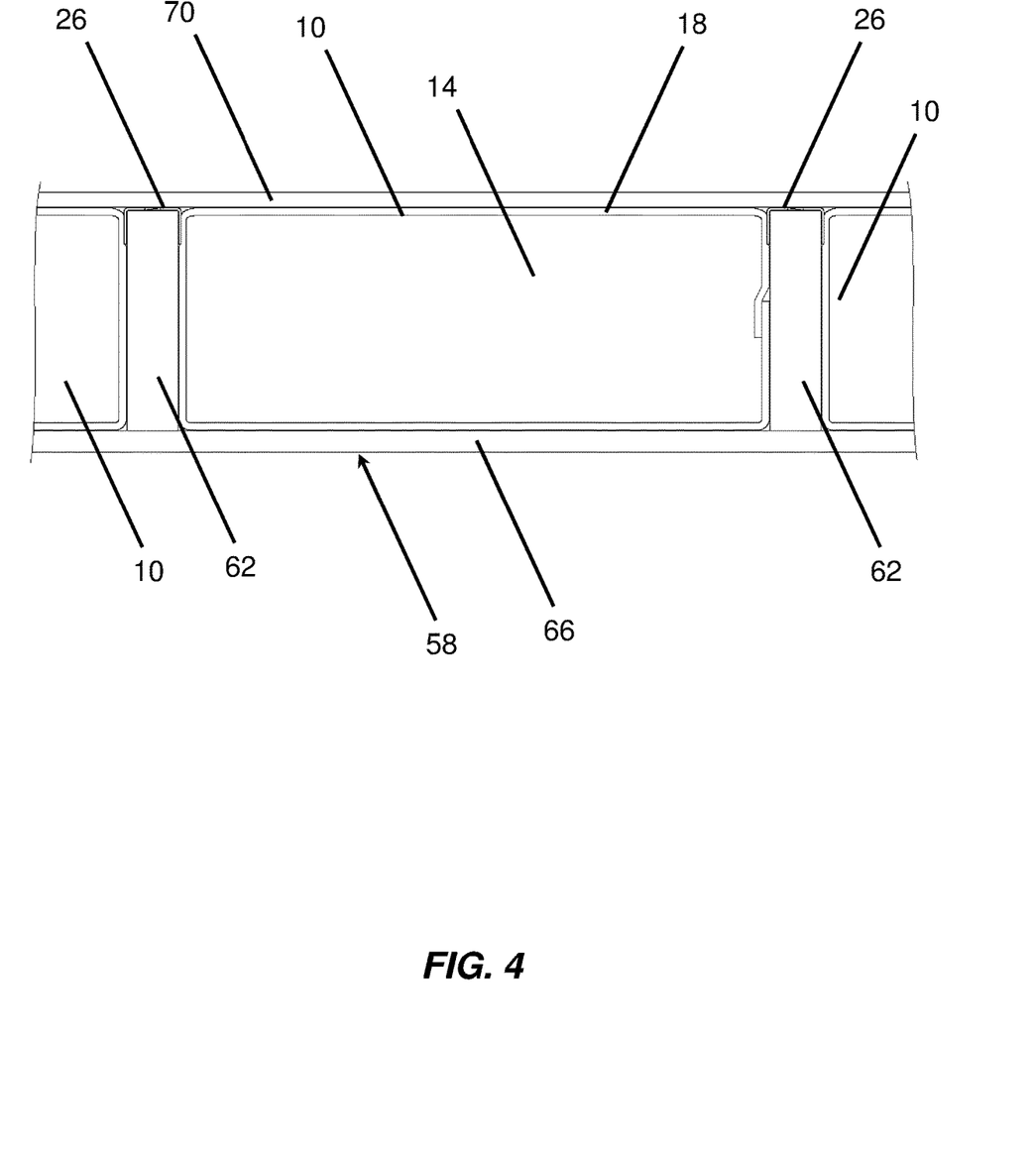
FIG. 4 is a drawing which shows a cross-sectional view of the composite insulation batt installed in a building cavity.

FIG. 4 shows a composite insulation batt 10 installed in a building cavity 58. The building cavity may be defined by a first framing stud 62, a second framing stud 62, a first panel 66, and a second panel 70. The studs 62 may be metal or wood studs and may be part of a wall, floor, or ceiling of a building, for example. The first panel 66 may an exterior building surface or sheathing, a roof surface, an interior wall surface, etc. The second panel 70 may be an interior wall surface, a floor surface, a ceiling or roof space, etc. The composite insulation batt 10 fits snugly into the building cavity 58. The added rigidity of the composite insulation batt 10 can assist the installers in properly filling the building cavity without leaving gaps and spaces which degrade the performance of insulation batts. The attachment flanges 26 may be used to attach the composite insulation batt 10 to the building framing 62 and prevent movement of the composite insulation batt 10 during and after construction of the building. The attachment flanges 26 are often stapled to the building flaming members 62. Where the composite insulation batt 10 is cut to length to fit the batt 10 into a building cavity 58, careful cutting and fitting of the composite insulation batt 10 causes the cut ends of the composite insulation batt 10 to fit snugly against the adjacent bottom rail, top rail, or other framing member defining the ends of the cavity 58 and preserves the performance of the composite insulation batt 10.

Figure 5:
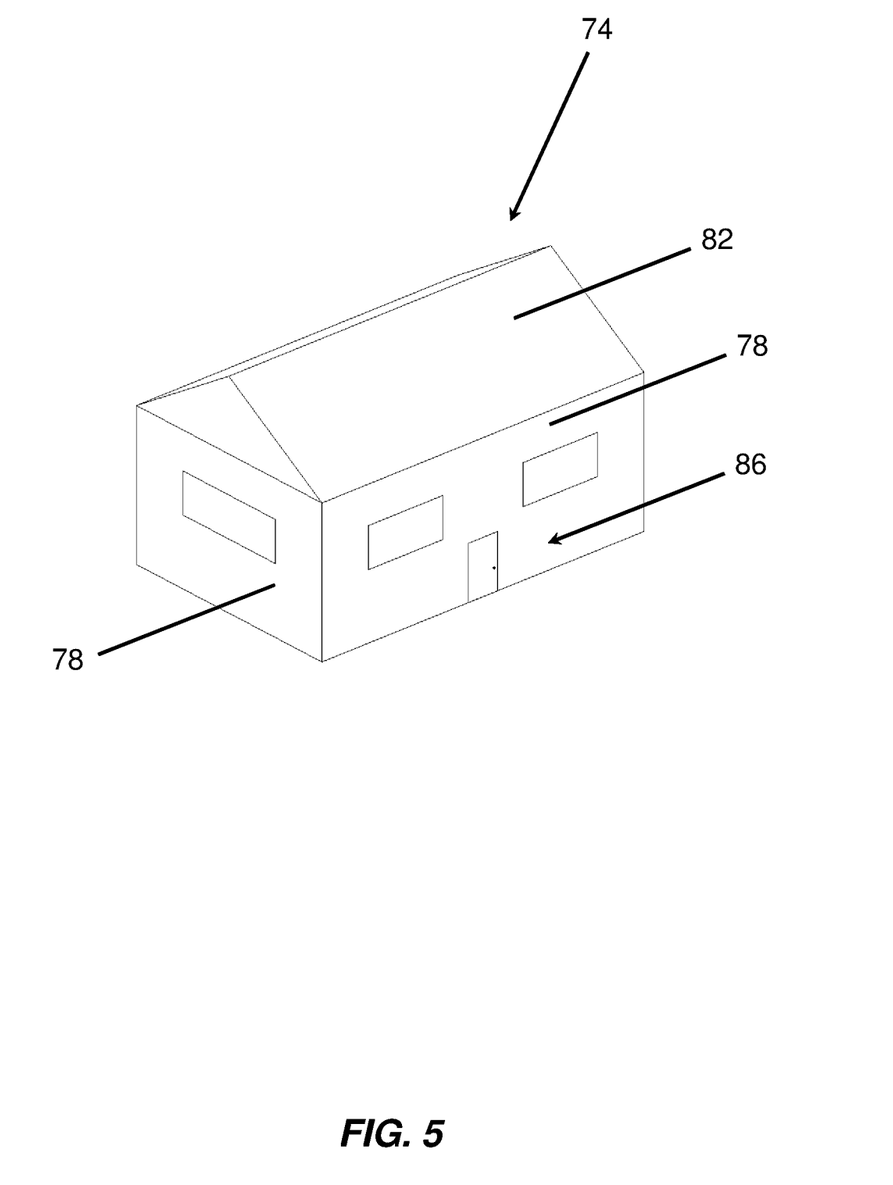
FIG. 5 shows a drawing of a building having the composite insulation batt.

FIG. 5 shows an example building 74 and indicates the many locations where the composite insulation batt 10 may be used in a building cavity 58. The building cavity 58 may be found in a wall 78, a ceiling or roof 82, an interior floor (indicated at 86) or another part of the building 74 where insulation is desired. Typically, the composite insulation batt 10 is disposed between structural framing members of the building 74 and is often disposed adjacent a panel of building sheathing material.

The composite insulation batt 10 is more user friendly than conventional fiberglass insulation batts for several reasons. The sheath 18 encases the fiberglass batt core 14 and largely shields the installers from the irritating and injurious fiberglass fibers. The rigidity of the composite insulation batt 10 increases the ease of measuring, cutting, and installing the composite insulation batt 10.

Above all, the composite insulation batt 10 dramatically increases the R-value (insulating capability) of the insulation batt. The composite insulation batt 10 provides a dramatically increased R-value compared to a similarly sized batt of fiberglass insulation, allowing a significantly increased R-value of insulation to be provided within a given thickness of building cavity. The composite insulation batt 10 frequently provides an R-value which is greater than the sum of the R-values of its component parts. In many cases, the composite insulation batt 10 provides double or more than double the R-value of an equivalently sized fiberglass insulation batt. This can become important in several situations.

In new construction, local building codes more commonly require a minimum R-value to be achieved for the outer envelope of the building. Windows have a low R-value compared to insulated framed walls and lower the average R-value of the building. Thus, it can be difficult to install a desired number of windows in a building and meet the necessary average R-value required by code. The composite insulation batt 10 dramatically increases the R-value of the wall and ceiling spaces in the building envelope and allows more windows to be used in a design while still meeting a required average R-value for the building.

Another significant benefit of the composite insulation batt 10 is found in renovating buildings. In many areas, renovating or remodeling a sufficient percentage of a building requires that the building be brought up to current building codes. The current building codes may require a significantly higher R-value of insulation to be used in exterior surfaces of the building, or may require a higher average R-value for the building envelope as discussed above. This requirement to increase the R-value of the building envelope can cause significant difficulty in renovating older buildings. With existing insulation, it may be necessary to rebuild walls and ceilings to a greater thickness to achieve the greater R-value required for the building envelope. This requires removal of the inner surfaces (e.g. walls, ceilings) of the building and reframing these walls or ceilings to have an increased thickness. This may significantly change the architecture of the building.

The composite insulation batt 10 alleviates this problem by allowing a much higher R-value of insulation to be placed into an existing cavity without increasing the cavity thickness and reengineering the building architecture. For example, a cavity formed by 2 by 8 studs (about 7.5 inches thick) may have had R22 insulation with its existing fiberglass batts. Commercially available bubble-wrap insulation products typically have an R-value of about 1.5. The composite insulation batt 10 can provide an R-value in the 2 by 8 cavity which is about R80; notably higher than the sum of the individual R-values of the fiberglass batt 14 and sheath 18. This dramatically increases the R-value of that building surface without making it thicker. This eliminates costly reconstruction of the building envelope and makes possible some renovation work that may not have been previously possible.

The composite insulation batt 10 thus allows for construction of buildings with windows or other architectural features which compromise R-values of the building envelope while still meeting average envelope R-values required by building codes. The composite insulation batt 10 allows for the renovation of existing buildings to greatly increase the envelope R-value of the building without re-engineering the building. Costly and problematic reconstruction of the building envelope to increase its wall/ceiling thickness is avoided. New buildings may be built to have much greater envelope R-values while maintaining a desired amount of windows and without using additional framing resources to make the walls and ceilings thicker.

The composite insulation batt thus provides many benefits in increasing the R-value of desired parts of a building such as the exterior envelope. In many cases it allows for construction work which may not have otherwise been feasible under building codes.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A composite insulation batt comprising:
a core comprising an elongate and generally rectangular insulating batt of fiberglass fibers;
a sheath surrounding front, back, and side faces of the fiberglass batt core and extending along a length of the fiberglass batt core, the sheath comprising:
an inner surface;
an outer surface;
a low density and closed cell insulating core layer disposed between the inner surface and the outer surface; and
an outer layer of reflective material attached to the outer surface of the sheath;
wherein the sheath is disposed around the insulating fiberglass batt such that the inner surface of the sheath contacts the fiberglass batt and such that the sheath fits snugly around the fiberglass batt.

2. The composite insulation batt of claim 1, wherein the sheath core layer comprises a closed cell plastic.

3. The composite insulation batt of claim 1, wherein the sheath core layer comprises a layer of material having a plurality of pockets which define a plurality of generally uniform bubbles.

4. The composite insulation batt of claim 1, wherein the sheath core layer comprises a first layer of material having a plurality of pockets which define a plurality of generally uniform bubbles, a second layer of material having a plurality of pockets which define a plurality of generally uniform bubbles, and a generally flat layer of plastic disposed between the first layer of material and the second layer of material.

5. The composite insulation batt of claim 1, wherein the sheath core layer comprises 90 percent or greater gas space.

6. The composite insulation batt of claim 1, wherein the sheath further comprises an inner layer of reflective material attached to the inner surface of the sheath, wherein the inner layer of reflective material is disposed adjacent the insulating fiberglass batt.

7. The composite insulation batt of claim 1, further comprising a first attachment flange disposed along a first side of the composite insulation batt and a second attachment flange disposed along a second side of the composite insulation batt.

8. A composite insulation batt comprising:
a core comprising an insulating batt of fiberglass fibers;
a sheath surrounding the fiberglass batt core, the sheath comprising:
an inner surface;
an outer surface;
a low density closed cell core layer disposed between the inner surface and the outer surface, the core comprising 90 percent or greater gas space; and
wherein the sheath is disposed around the insulating fiberglass batt such that the inner surface of the sheath contacts the fiberglass batt and such that the sheath fits snugly around the fiberglass batt.

9. The composite insulation batt of claim 8, wherein the composite insulation batt is sized and shaped to facilitate placement in a cavity of a building between a first surface and a second surface whereby the composite insulation batt provides thermal insulation between the first surface of the building and the second surface of the building.

10. The composite insulation batt of claim 8, wherein the closed cell core layer of the sheath comprises a layer of material having a plurality of pockets which define a plurality of uniform bubbles formed between layers of plastic.

11. The composite insulation batt of claim 8, wherein the sheath further comprises an outer layer of reflective material attached to the outer surface of the sheath.

12. The composite insulation batt of claim 11, wherein the outer layer of reflective material comprises a layer of aluminum.

13. The composite insulation batt of claim 11, wherein the outer layer of reflective material comprises a layer of metalized plastic.

14. The composite insulation batt of claim 8, wherein the sheath further comprises an inner layer of reflective material attached to the inner surface of the sheath and wherein the inner layer of reflective material contacts the insulating fiberglass batt.

15. The composite insulation batt of claim 8, wherein the closed cell core layer of the sheath comprises a first layer of material having a plurality of pockets which define a plurality of uniformly sized bubbles, a second layer of material having a plurality of pockets which define a plurality of uniformly sized bubbles, and a generally flat layer of plastic disposed between the first layer of material and the second layer of material.

16. The composite insulation batt of claim 8, further comprising a first attachment flange disposed along a first side of the composite insulation batt and a second attachment flange disposed along a second side of the composite insulation batt.

17. A composite insulation batt comprising:
a core comprising an insulating batt of fiberglass fibers;
a sheath surrounding the fiberglass batt core, the sheath comprising:
an inner surface;
an outer surface;
a low density core layer of a closed cell material disposed between the inner surface and the outer surface; and
wherein the sheath is disposed around the insulating fiberglass batt such that the inner surface of the sheath contacts the fiberglass batt.

18. The composite insulation batt of claim 17, wherein the sheath core layer comprises a layer of material having a plurality of pockets which define a plurality of bubbles.

19. The composite insulation batt of claim 17, wherein the sheath further comprises an outer layer of reflective material attached to the outer surface of the sheath.

20. The composite insulation batt of claim 17, further comprising a first attachment flange disposed along a first side of the composite insulation batt and a second attachment flange disposed along a second side of the composite insulation batt.

* * * * *